S. S. Stone.
Collar Machine.
No. 2024
Reissued Jul. 4, 1865.
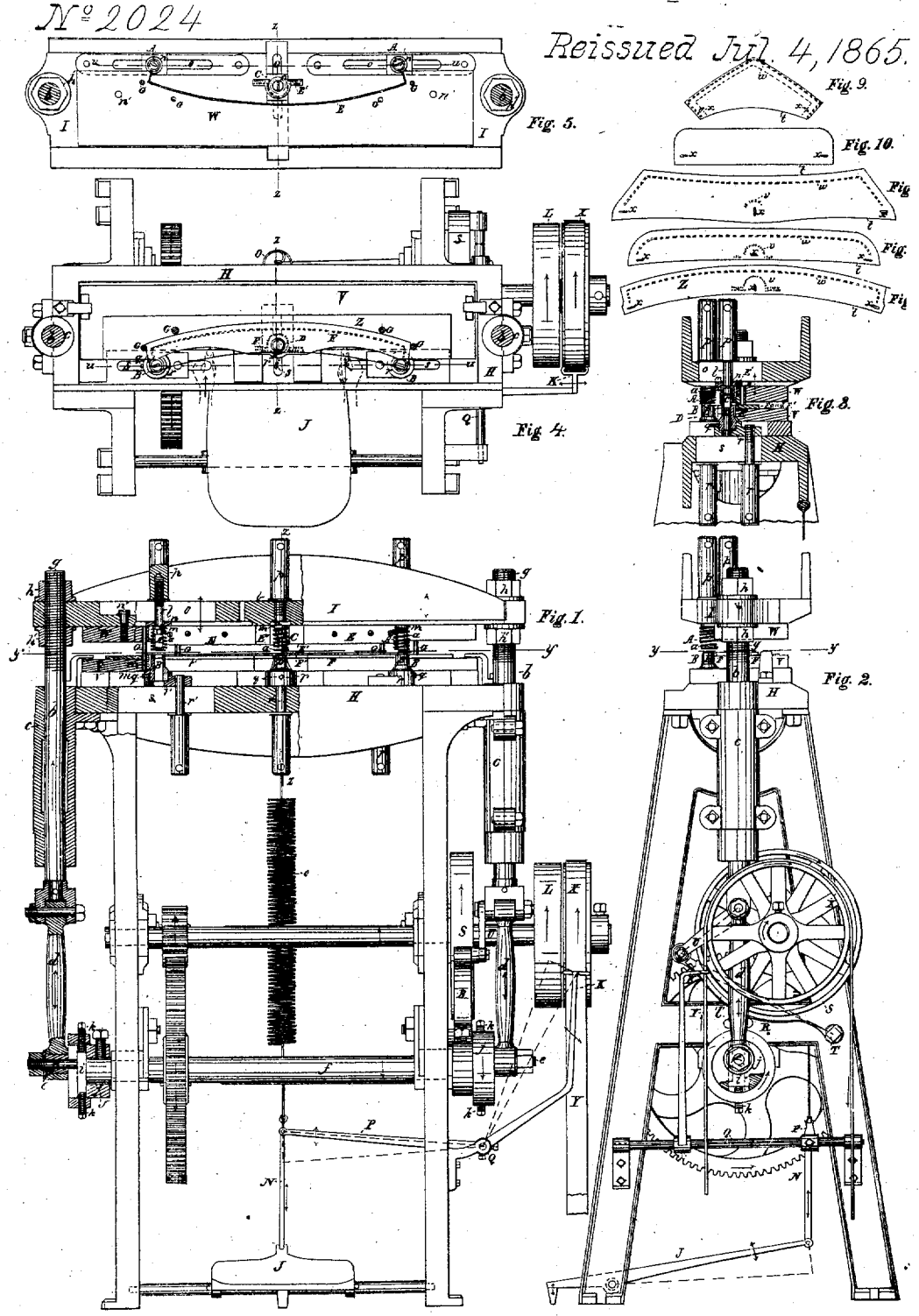
Witnesses, { P. J. Marsh, Austin F. Park }
Inventor, Samuel S. Stone

UNITED STATES PATENT OFFICE.

SAMUEL S. STONE, OF TROY, NEW YORK.

MACHINE FOR INCISING BUTTON-HOLES AND EMBOSSING AND PRINTING ARTICLES OF WEARING-APPAREL.

Specification forming part of Letters Patent No. 43,932, dated August 23, 1864; Reissue No. 2,024, dated July 4, 1865.

*To all whom it may concern:*

Be it known that I, SAMUEL S. STONE, of the city of Troy, in the county of Rensselaer and State of New York, have invented certain new and useful improvements in machinery for punching button-holes in and stamping imitation stitching and letters or figures upon collars, cuffs, or wristbands of paper, stiffened cloth, paper and cloth combined, or other suitable material; and I do hereby declare that the following is a full, clear, and exact description thereof, reference being had to the accompanying drawings, in which—

Figure 1 is a front elevation with some parts shown in section; Fig. 2, an end elevation; Fig. 3, a partial section at the line *z z* in Figs. 1, 4, and 5; Fig. 4, a top view of the parts below the line *y y* in Figs. 1 and 2; and Fig. 5, a bottom view of the parts above the said line *y y*, all of a machine embodying my invention. Figs. 6, 7, 8, 9, and 10 are plans of different styles and sizes of collars, cuffs, and wristbands.

The same letters refer to like parts in all the figures, and the arrows therein indicate the directions in which the contiguous parts move.

Some styles of collars, cuffs, or wristbands, of paper, or paper and cloth combined, have only two oblong button-holes, *x x*, Figs. 9 and 10, in the ends of the article, and other forms have a central oblong button-hole, *x'*, Figs. 6, 7, and 8, in addition to the end ones. The oblong end button-holes, *x x*, in any such collar, cuff, or wristband are commonly made at equal, or nearly equal, distances from the end edges, and at uniform, or nearly uniform, distances from the top and the bottom edges of the article at the ends thereof, as shown by Figs. 6, 7, 8, 9, and 10, and the two end button-holes are commonly made endwise, or nearly so, to each other, as shown in Figs. 6, 7, 8, and 10; but in different styles sometimes extend in various directions in respect to each other, as in Figs. 9 and 10. The central oblong button-hole, *x'*, is commonly made crosswise, or nearly so, to the end ones, *x x*, as in Figs. 6 and 8; but is sometimes made parallel, or nearly so, thereto, as in Fig. 7; and such collars, cuffs, or wristbands are made of various lengths between the two ends, or the end and middle button-holes, as shown by Figs. 6, 7, 8, 9, and 10, and with the middle button-hole at various distances from a line joining the two end ones, as shown by Figs. 6, 7, and 8. Besides, collars, cuffs, or wristbands of paper, or paper and cloth combined, commonly have a longitudinal row or rows of imitation stitching, *w*, and letters or figures *v* stamped thereon, with the letters or figures between or within the circle of the two end button-holes and opposite to the row or rows of imitation stitching, and with the end and central button-holes respectively opposite, or nearly so, to the ends and middle of the row or rows of imitation stitching, as indicated by Figs. 6, 7, 8, and 9.

Now, some parts of my invention consist in arranging and making adjustable two oblong male button-hole punches, A A or A C, Figs. 1, 4, and 5, and two corresponding female punch-receiving dies, B B or B D, in combination in various modes, to wit: First, in such manner that the combination will at one operation thereof punch two oblong button-holes endwise, or nearly so, to each other, and at various distances apart, as is commonly required in the ends of paper collars, cuffs, or wristbands of different lengths; second, in such manner as to punch two oblong button-holes apart from each other at one operation and with their longest diameters pointing or extending in various directions, as is commonly required in the ends of collars, cuffs, or wristbands of various shapes; third, so that the combination will punch two oblong button-holes at one operation and in various directions and at different distances apart, as commonly required in the ends of paper collars, cuffs, or wristbands of various shapes and different lengths; fourth, so as to punch two oblong button-holes crosswise, or nearly so, to each other at one operation and at various distances apart, as is commonly required in the middle and one end of paper collars of different lengths.

Other parts of my invention consist in arranging, or arranging and making adjustable, three oblong male button-hole punches, A A C, Figs. 1, 3, 4, and 5, and three corresponding female punch-receiving dies B B D, in combination in various modes, to wit: First, in such manner that the combination will, at one operation thereof, punch two oblong button-holes apart from and endwise, or nearly so, to each other, and another oblong button-hole midway, or nearly so, between and crosswise, or nearly so, to the said end button-holes, as is generally required in the ends and middle of the more common styles of paper collars; second, so that the combination will punch a central and two end oblong button-holes at one operation, and the end button-holes at various distances apart, as commonly required in the ends and middle of paper collars of various lengths; third, in such manner as to punch a central and two-end oblong button-holes apart from each other at one operation, and the end button-holes in various directions, as commonly required in the ends and middle of paper collars of various shapes; fourth so as to punch a central and two end oblong button-holes at one operation, and the end button-holes in various directions and at different distances apart, as commonly required in the ends and middle of paper collars of various shapes and different lengths; fifth, so as to punch a central and two end oblong button-holes apart from each other at one operation, and the central button-hole at various distances from a line joining the two end ones, as often required in the ends and middle of paper collars of various shapes; sixth, so as to punch a central and two end oblong button-holes at one operation, and the central button-hole at various distances from a line joining the two end ones, and the two end button-holes at various distances apart, as often required in the ends and middles of paper collars of various shapes and different lengths; seventh, so as to punch a central and two end oblong button-holes apart from each other at one operation, and the end button-holes in various directions, and the central one at different distances from a line joining the two end ones, as often required in the ends and middle of paper collars of various shapes; eighth, so as to punch a central and two end oblong button-holes at one operation, and the end button-holes in various directions and at different distances apart, and the central one at various distances from a line joining the two end ones, as often required in the ends and middles of paper collars of various shapes and different lengths; ninth, so as to punch a central and two end oblong button-holes apart from each other at one operation, and the central button-hole with its longest diameter in different directions in respect to a line joining the two end ones, as is sometimes required in the ends and middle of various styles of paper collars; tenth, so as to punch a central and two end oblong button-holes apart from each other at one operation, and the central button-hole in various directions in respect to and at different distances from a line joining the two-end button holes, as is sometimes required in the ends and middle of various shapes and styles of paper collars.

Another part of my invention consists in so arranging and combining an imitation stitching-stamp, E, Figs. 1, 3, and 5, and a matrix or impression-bed, F, Figs. 1, 3, and 4, for the stitching-stamp, and one or more male button-hole punch or punches and corresponding punch-receiving die or dies, that such combination will, at one operation, stamp a row or rows of imitation stitching and punch one or more button-hole or button-holes opposite, or nearly so, to the middle or one or both of the ends, or the middle and one or both of the ends, of the row or rows of imitation stitching, as commonly required by collars, cuffs, and wristbands of paper, or cloth and paper combined.

Another part of my invention consists in so arranging and combining a type-block, E′, Figs. 1, 3, and 5, of letters or figures, or letters and figures, and a matrix or impression-bed, F′, Figs. 1, 3, and 4, for the type-block, and two end, or end and central, male button-hole punches, adjustable to different positions in respect to each other, and corresponding adjustable punch-receiving dies, that such combination will stamp or imprint letters or figures, or letters and figures, indicative of the size or style of the article operated upon, or the date of a patent thereon, or the name or trade-mark of the patentee or manufacturer thereof, or other desirable information, and also punch two end, or end and central, button-holes with the letters or figures, or letters and figures, between the two end button-holes, all at one operation, and the button-holes in various positions in respect to each other, as is commonly required by paper or cloth and paper collars of various shapes or different lengths.

Another part of my invention consists in so arranging and combining an imitation-stitching stamp, type-block, and corresponding impression-beds therefor, and one or more male button-hole punch or punches, and corresponding punch-receiving die or dies, that such combination will, at one operation, stamp a row or rows of imitation stitching, and opposite thereto letters or figures, or letters and figures, and also punch one or more button-hole or button-holes opposite, or nearly so, to the middle, or one or both of the ends, or the middle and one or both of the ends, of the row or rows of imitation stitching, as is commonly required by paper or cloth and paper collars, cuffs, and wristbands.

Another part of my invention consists in so arranging stops or guides G G G G, Figs. 1, 4, and 5, and end, or end and central, oblong male button-hole punches, A A, or A A and C, and corresponding punch-receiving dies B B, or B B and D, in combination, that a person, upon simply inserting by hand a cut out blank for a collar, cuff, or wristband of suitable size and shape between the said punches and dies when the latter are open, as shown in Figs. 1 and 2, and into or against the stops or guides G, as shown in Fig. 4, will thereby secure the punching—when the driving mechanism once closes the said punches and dies, as shown in Fig. 3—of oblong button-holes in the ends, or ends and middle, of the cut out collar, cuff, or wristband thus inserted, and the two oblong end button-holes not only in the proper endwise, or nearly endwise, direction in respect to each other, but also at the proper equal or uniform distances from the two end and the top and bottom edges of the article, as is required in the more common forms of collars, cuffs, and wristbands of paper, or paper and cloth combined.

In carrying the aforesaid parts of my invention into operation I employ any suitable driving mechanism and arrange and combine together the aforesaid punching, or punching and stamping, devices, and make the punching devices adjustable by the use of any suitable mechanical means.

And to enable others skilled in the art to make and use my invention, I will proceed to more fully describe the machine which is represented by Figs. 1, 2, 3, 4, and 5 of the aforesaid drawings, and in which all of the aforesaid parts of my invention are embodied.

In that machine the end and central oblong button-hole punches, A A C, imitation-stitching stamp E, and type-block E′ are all arranged and fastened on the lower face of one reciprocating stock or platen I, and the corresponding end and central punch-receiving dies, B B D, and impression-beds F F′ are all arranged and fastened on the upper face of a bed-plate, H, which is opposite to the platen I and fast on a supporting-frame, A″. The platen I is reciprocated toward and from the bed-plate H by a driving mechanism consisting of a rotary shaft, *f*, having two cranks or eccentrics, *e e*, fast thereon and connected to the platen by two pitmen, *d d*, and guide-rods *b b*, which latter are fast to the platen and guide its reciprocating movements by sliding in boxes *c c*, fast on the frame A″. The rods *b b* are fastened to the platen I by screws *g g* and nuts *h h′ h h′* on the rods, in order that the platen may be thereby readily adjusted to make the punches or imitation-stitching stamp act properly with the corresponding punch-receiving dies or impression-bed. Springs *a*, Figs. 1 and 3, are commonly applied to shed or help release the punched articles from the punches.

In the said drawings the two oblong end-punches, A A, Figs. 1 and 5, are shown arranged endwise, or nearly so, to each other, and the central oblong punch, C, midway, or nearly so, between and crosswise, or nearly so, to the end punches, and the said end and central punches respectively opposite, or nearly so, to the ends and middle of the imitation-stitching stamp E, and the type-block E′, opposite to the stitching stamp and between the two end punches, and the corresponding punch-receiving dies B B D, and impression beds F F′, Figs. 1 and 4, are shown in like positions in respect to each other, so as to punch two oblong button-holes, *x x*, Fig. 8, apart from and endwise, or nearly so, to each other, and another oblong button-hole, *x′*, midway, or nearly so, between and crosswise, or nearly so, to the end ones, and stamp a row or rows of imitation stitching, *w*, opposite, or nearly so, to the three button-holes, and imprint letters and figures *v* opposite to the row or rows of imitation stitching, and between the two end button-holes, as shown by Fig. 8.

In order that the machine may punch the two end button-holes at various distances from each other, and from the central one, and the latter at various distances from a line joining the two end ones, the end punches, A A, are made adjustable toward and from each other, and the central one, *c*, toward and from a line joining the two end punches, and the end and central punch-receiving dies, B B and D, are adjustable in the same way; and in order that the machine may punch the oblong end button-holes in various directions in respect to each other, and the central one in various directions in respect to a line joining the two end button-holes, each oblong punch A A C and die B B D is made adjustable axially. The end punches, A A, are made adjustable toward and from each other, and the central one, *c*, toward and from a line joining the two end ones, by having each punch furnished with a screw-bolt, *l*, and nut *p*, extending through and clamping against the edges of a slot, *o*, Figs. 1, 3, and 5, in the stock I; and each punch is made adjustable axially by being free to be turned on or with its holding-bolt *l* when the latter shall be loosened, and each die B B D is made adjustable axially by being free to be turned in a die-holder, *r*, Figs. 1, 3, and 4, on the stock H upon loosening a die-holding set-screw, *q*; and the two end dies, B B, are made adjustable toward and from each other, and the central one, D, toward and from a line joining the two end dies by screw-bolts *r′*, extending through slots *s s s*, Figs. 1, 3, and 4, in the bed-plate H and screwing into the die-holders *r*. The stops or guides G are carried by the reciprocating stock I, and their positions can be widely varied to suit the different sized and shaped collars, cuffs, and wristbands to be operated upon, or the guides may be secured to the bed-plate H, instead of to the stock I; but in using the machine to stamp a row or rows of imitation stitching upon and also to punch button-holes in collars, cuffs, or wristbands of various sizes or shapes I then generally prefer to have the stamp E and guides G fastened to a removable plate, W, temporarily fastened to the platen I, and to have the impression-bed F (which may commonly be of leather) fastened on another plate, V, resting on the bed-plate H, and kept in position by the guides G, extending into openings *m′*, Fig. 1, in the plate V, and then have and use a different set of the plates W and V, with their guides G, imitation-stitching stamp, and impression-bed for each size or form of collar, cuff, or wristband operated upon.

The crank-shaft *f* is revolved by a belt, Y, Figs. 1 and 2, running on a pulley, L, that is fast on a rotary shaft, H′, which turns in bearings on the frame A″ and has a loose pulley, X, alongside of the pulley L, and a fast pinion, that is marked *n′*, and that gears into a spur-wheel, $n^2$, fast on the shaft *f*. A brake-wheel, S, is fast on the shaft H′, and a brake-band, R, is secured at one end, T, Fig. 2, to the frame A″, and pivoted at the other end to one end of a link, U, which has its other end pivoted to one of the two rods *b*, that are fast on the reciprocating stock I, all in such manner that the brake-band R will be pressed against the wheel S only while the platen I is in its elevated position, with the punching devices open, and at that time with so much force as to thereby instantly stop the platen in its elevated position if the belt Y shall then be shifted from the driving-pulley L onto the loose one X, but with so little force as to allow the reciprocating movement of the platen to be instantly renewed upon shifting the driving-belt from the loose pulley onto the driving one. A treadle or foot-lever, J, is connected, by a link, N, arm P, and rock-shaft Q, to a belt-shifter, K, connected with the driving-belt Y, so that a person, on pressing down the treadle J with his or her foot or feet, will thereby shift the running belt from the loose pulley onto the fast one, and thereby cause the belt to overcome the brake and give reciprocating motion to the platen so long as the treadle shall be kept depressed, and so that on relieving the treadle from such foot pressure a spring, O, will instantly raise the treadle, and thereby shift the belt from the pulley L onto the loose one X and allow the brake to stop the platen in its elevated position.

What I claim as my invention, and desire to secure by Letters Patent, is—

1. Two oblong male button-hole punches and two corresponding female punch-receiving dies, combined and arranged and made adjustable, so as to punch two oblong button-holes endwise, or nearly so, to each other at one operation and at various distances apart, substantially as herein set forth.

2. Two oblong male button-hole punches and two corresponding punch-receiving dies, combined and arranged and made adjustable, so as to punch two oblong button-holes apart from each other at one operation and in various directions, substantially as herein set forth.

3. Two oblong male button-hole punches and two corresponding punch-receiving dies, combined and made adjustable, so as to punch two oblong button-holes at one operation and in various directions and at different distances apart, substantially as herein set forth.

4. Two oblong male button-hole punches and two corresponding receiving-dies, combined and arranged and made adjustable so as to punch two oblong button-holes crosswise, or nearly so, to each other at one operation, and at various distances apart, substantially as herein set forth.

5. Three oblong male button-hole punches and three corresponding punch-receiving dies, combined and arranged so as to punch two oblong button-holes apart from and endwise, or nearly so, to each other, and another oblong button-hole midway, or nearly so, between and crosswise, or nearly so, to the said end button-holes, all at one operation, substantially as herein set forth.

6. Three oblong male button-hole punches and three corresponding receiving-dies, combined and arranged and made adjustable so as to punch a central and two end oblong button-holes at one operation and the end button-holes at various distances apart, substantially as herein set forth.

7. Three oblong male button-hole punches and three corresponding receiving-dies, combined and arranged and made adjustable so as to punch a central and two end oblong button-holes apart from each other at one operation, and the end button-holes in various directions, substantially as herein set forth.

8. Three oblong button-hole punches and three corresponding punch receiving dies, combined and arranged and made adjustable, so as to punch a central and two end oblong button-holes at one operation, and the end button-holes in various directions, and at different distances apart, substantially as herein set forth.

9. Three oblong male button-hole punches and three corresponding punch-receiving dies, combined and arranged and made adjustable, so as to punch a central and two end oblong button-holes apart from each other at one operation, and the central button-hole at various distances from a line joining the two end ones, substantially as herein set forth.

10. Three oblong male button hole punches and three corresponding punch-receiving dies, combined and arranged and made adjustable, so as to punch a central and two end oblong button-holes at one operation, and the central button-hole at different distances from a line joining the two end ones, and the two end button-holes at various distances apart, substantially as herein set forth.

11. Three oblong male button-hole punches and three corresponding punch-receiving dies, combined and arranged and made adjustable, so as to punch a central and two end oblong button-holes apart from each other at one operation, and the end button-holes in various directions, and the central button-holes at different distances from a line joining the two end ones, substantially as herein described.

12. Three oblong male button-hole punches and three corresponding punch-receiving dies, combined and arranged and made adjustable, so as to punch a central and two end oblong button-holes at one operation, and the end button-holes in various directions and at different distances apart, and the central button-hole at various distances from a line joining the two end ones, substantially as herein set forth.

13. Three oblong male button-hole punches and three corresponding punch-receiving dies, combined and arranged and made adjustable, so as to punch a central and two end oblong button-holes apart from each other at one operation, and the central oblong button-hole in different directions in respect to a line joining the two end button-holes, substantially as herein described.

14. Three oblong male button-hole punches and three corresponding punch-receiving dies, combined and arranged and made adjustable, so as to punch a central and two end oblong button-holes apart from each other at one operation, and the central button-hole in different directions in respect to and at various distances from a line joining the two end button-holes, substantially as herein described.

15. An imitation stitching-stamp, E, with an impression-bed, F, therefor, and one or more male button-hole punch or punches with corresponding punch-receiving die or dies, all combined and arranged substantially as herein described.

16. A type-block, E′, of letters or figures, or letters and figures, with an impression-bed therefor, and two end, or end and central, male button-hole punches adjustable to different positions with corresponding adjustable punch-receiving dies, all combined and arranged substantially as herein described.

17. An imitation-stitching stamp, E, and a type-block, E′, with impression-beds therefor, and one or more button-hole punch or punches with a corresponding punch-receiving die or dies, all combined and arranged substantially as herein described.

18. Guides or stops G and end, or end and central, oblong male button-hole punches and corresponding female punch-receiving dies, all combined and arranged substantially as herein described.

SAMUEL S. STONE.

Witnesses:
ALEXANDER B. SLOCUM,
AUSTIN F. PARK.